United States Patent

[11] 3,581,977

| [72] | Inventors | George Kirsky;<br>Patricia A. Kirsky, both of 11900<br>Edgewater Drive, Lakewood, Ohio 44107 |
|---|---|---|
| [21] | Appl. No. | 731,133 |
| [22] | Filed | May 22, 1968 |
| [45] | Patented | June 1, 1971 |

[54] LITTER BOXES
10 Claims, 6 Drawing Figs.

[52] U.S. Cl............................................... 229/37,
229/44, 206/44
[51] Int. Cl................................................ B65d 5/08
[50] Field of Search.................................. 229/44, 38,
37; 206/44, 45.28, 45.29

[56] References Cited
UNITED STATES PATENTS

| 1,495,398 | 5/1924 | Coleman | 229/44X |
| 2,031,806 | 2/1936 | Weiss | 229/38X |
| 2,260,428 | 10/1941 | Barr et al. | 206/44(M) |
| 2,298,136 | 10/1942 | Lavere | 206/44(M) |
| 2,439,768 | 4/1948 | Ball | 229/38 |
| 2,523,246 | 9/1950 | Elliott et al. | 229/38 |
| 2,926,777 | 3/1960 | Maguire | 206/44(M) |
| 3,058,582 | 10/1962 | Mairs | 206/44 |
| 3,176,904 | 4/1965 | Collura | 229/38X |

*Primary Examiner*—Davis T. Moorhead
*Attorney*—James F. Hespen

ABSTRACT: These litter boxes are designed to provide a container having a unique closure. The closure consists of a lid, several wings and a front panel which are hinged together along score lines and perforated lines and which, because of the angles at which they are folded, tend to distort certain panels of the closure apparatus during the closing process which thereby holds the lid in place when the lid is in the completely closed position.

PATENTED JUN 1 1971 3,581,977

INVENTORS
GEORGE KIRSKY
PATRICIA A. KIRSKY
BY
James F. Hayford
ATTORNEY

PATENTED JUN 1 1971

INVENTORS
GEORGE KIRSKY
PATRICIA A. KIRSKY
BY
*James F. Hayes*
ATTORNEY

LITTER BOXES

This invention relates to a new concept for a litter box which is convenient for handling a pet's litter because it is a product container (litter), an end-use tray and a completely disposable unit, all in one. An important aspect of this invention is the fact that the litter is not transferred from one container to another.

Ordinarily, the usual container for a feline pet's toilet is a plastic or metal pan which can be washed and reused, or a grocery-store-type corrugated box which is thrown away. The obvious disadvantage is that the dust from the litter during the filling process ordinarily filters through the air, creating a nuisance. This same phenomenon occurs when the used litter with the pet's waste product is disposed of. Usually, the litter is emptied into a garbage bag or wrapped in newspapers before it can be neatly thrown away. After this procedure the container should be cleaned before it is again used. This is a messy and time-consuming process.

It is the main object of this invention to provide a litter box containing litter which can be opened and conveniently used for a pet's waste product, and then reclosed and thrown away. Because of this litter box's unique closure system in which the lid, after being closed, will stay closed without applying any positive pressure to it, it therefore can be disposed of without spilling the soiled litter and thereby prevents odors from being emitted from the litter.

A further object is to provide a litter box which is a shipping container and an advertisement medium. Still another object is to supply a convenient take-home container for the consumer which stores easily and compactly because it can be stacked.

Some of the advantages of the invention lie in its simplicity of construction, its convenient and expeditious operation and in its adaptability to economical manufacture.

With the above more important objects and advantages in view, and other objects and advantages as may become apparent as this specification proceeds, the invention consists essentially in the arrangement and construction of parts as illustrated in the accompanying drawings in which.

Figure 1:
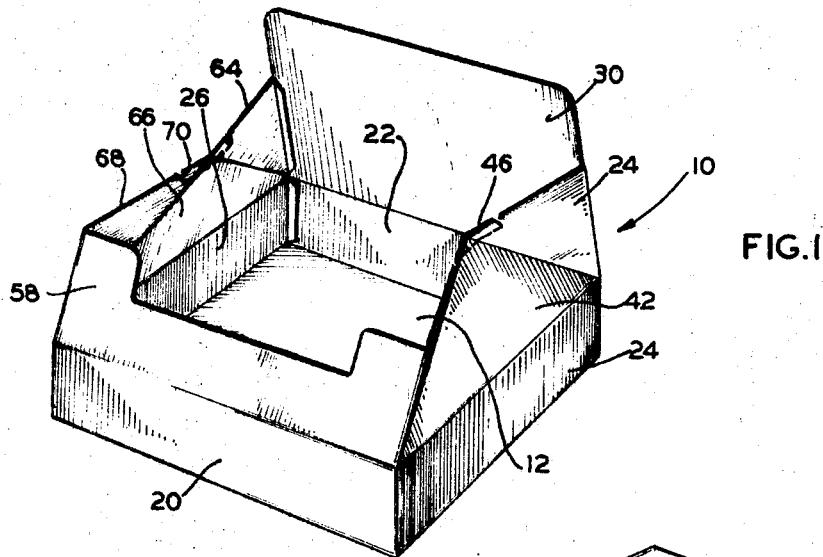
FIG. 1 is a perspective view of the invention showing the lid of the litter box in an open position.

Referring now to the drawing, a litter box 10 made in accordance with the present invention is shown to include a bottom of conventional construction such as two outer flaps 12 and 14 overlapping two inner flaps 16 and 18, the outer flaps 12 and 14 being hinged respectively to the front 20 and the back 22 and the inner flaps 16 and 18 being hinged respectively to the sides 24 and 26. Hinged to the back 22 along a score line 28 is a lid 30. The lid 30 is also hinged to the sides 24 and 26 by wings 32 and 34 along score lines 36 and 38.

Figure 3:
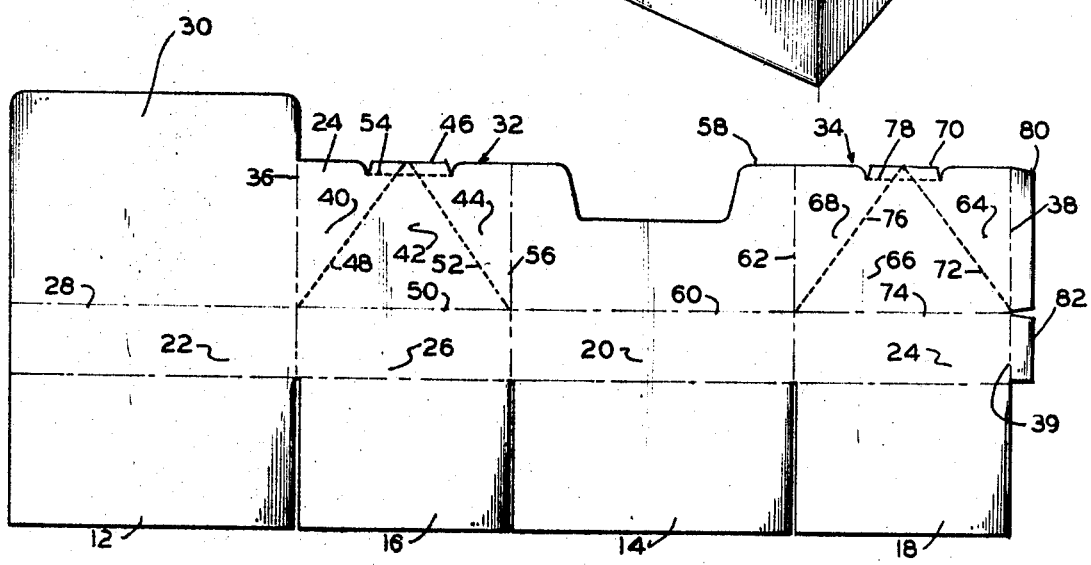
FIG. 3 is a top view of the blank from which the litter box is assembled.

The wing 32 consists of a side panel 40, a middle panel 42, a side panel 44 and a flap 46. The side panel 40 is hinged to the lid 30 along score line 36 and to the middle panel 42 along perforated line 48. The middle panel 42 is hinged to the side 26 along a score line 50 and to the side panel 44 along a perforated line 52. The flap 46 is hinged to the top of the panels 40, 42 and 44 along a perforated line 54 as is more fully seen in FIG. 3. Hinged to the wing 32 along score line 56 is a front panel 58 which in turn is hinged to the front 20 along score line 60 and to the wing 34 along score line 62.

The wing 34 consists of a side panel 64, a middle panel 66, a side panel 68 and a flap 70. The side panel 64 is hinged to the lid 30 along score line 38 and to the middle panel 66 along perforated line 72. The middle panel 66 is hinged to side 24 along score line 74 and to side panel 68 along perforated line 76. The flap 70 is hinged along perforated line 78 as is more fully seen in FIG. 3. It should be noted that the angles subtended by the score lines 36, 38, 56 and 62 and the perforated lines 48, 52, 72 and 76 are less than 45°, the importance of which will be later illustrated.

Figure 2:
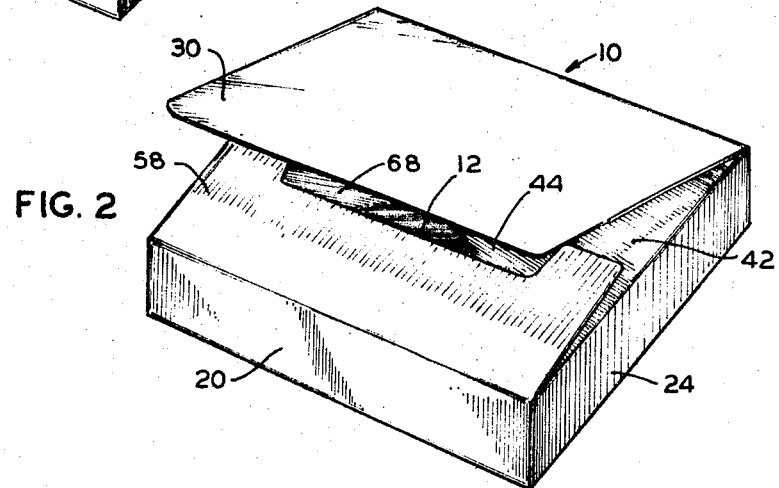
FIG. 2 is a perspective view of the invention showing the lid of the litter box in a partially opened position.

Hinged to the side panel 64, the side 24 and the inner flap 18 are extensions 80 and 82 which are adapted to be cemented to the inside of the lid 30 and the inside of the back 22 when the litter box 10 is in the assembled condition, as shown in FIGS. 1 and 2. When the litter box 10 is in the fully opened condition, as shown in FIG. 1, the lid 30, the wings 32 and 34 and the front panel 58 are all in a vertical position. When the lid 30 is partially closed, as is shown in FIG. 2, the wings 32 and 34 and front panel 58 fold inwardly under the lid 30. In the fully closed position, the top 30 partially rests on side panels 40 and 64 while the side panels 40 and 64 in turn rest on the middle panels 42 and 66 respectively. In the fully closed position, the side panels 44 and 68 also rest on the middle panels 42 and 66 respectively while the front panel 58 in turn rests upon the side panels 44 and 68.

As the lid 30 is being closed, a point is reached where it takes a positive pressure to continue closing it. This is because the angles subtended by the score lines 36, 38, 56 and 62 and the perforated lines 48, 52, 72, and 76 are less than 45°. This tends to slightly distort the middle panels 42 and 66 and as the closing process is continued, the panel 42 and 66 tend to resume their original shape forcing the lid 30 to snap shut without any further positive pressure.

The function of the flaps 46 and 70 is to maintain the litter box 10 in a fully opened position. This is achieved by bending the flaps 46 and 70 inwardly around score lines 54 and 78 when the lid 30 is in the fully opened position, thus maintaining it in that position. This result is accomplished by securing the panels on each of the wings 32 and 34 in the same plane, thus preventing them from folding inwardly. To release the lid 30 from the fully open position, the flaps 46 and 70 are folded upward until they lie within the same plane of the respective wings 32 and 34 of which they are a part.

Figure 4:
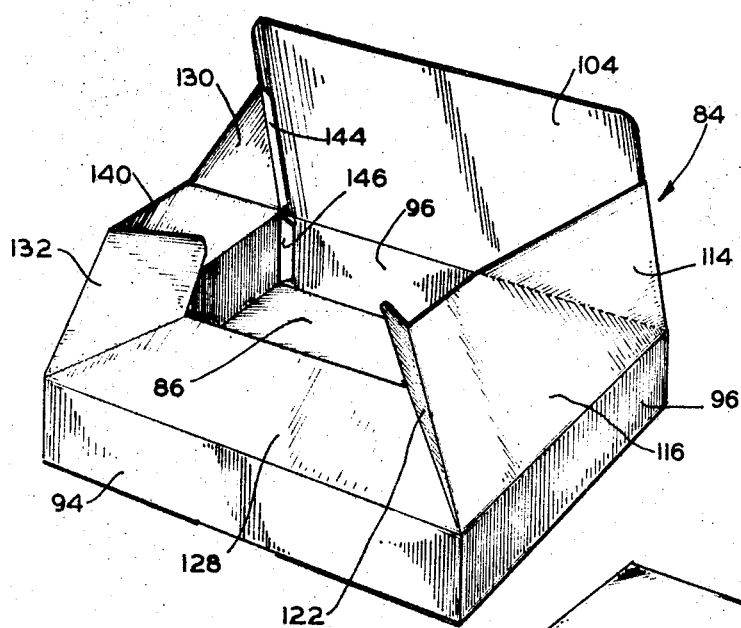
FIG. 4 is a perspective view of the modified invention showing the lid of the litter box in an open position.
Figure 5:
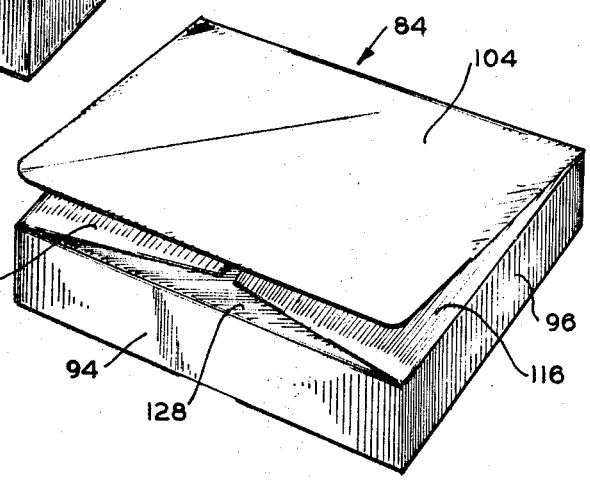
FIG. 5 is a perspective view of the modified invention showing the lid of the litter box in a partially opened position.
Figure 6:
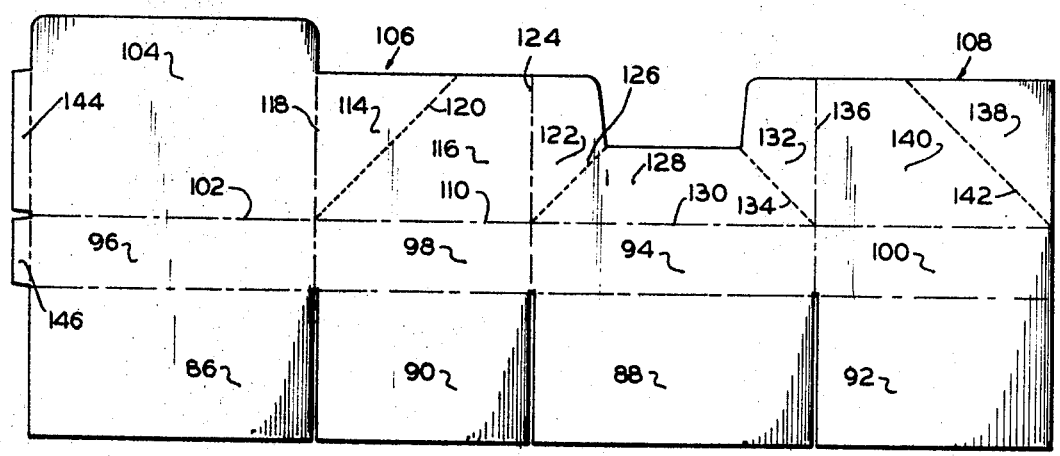
FIG. 6 is a top view of the blank from which the modified litter box is assembled.

Another embodiment made in accordance with the present invention is a litter box 84, as shown in FIGS. 4 through 6 which is shown to include a bottom of conventional construction such as two outer flaps 86 and 88 overlapping two inner flaps 90 and 92, the outer flaps 86 and 88 being hinged respectively to the front 94 and the back 96 and the inner flaps 90 and 92 being hinged respectively to the sides 98 and 100. Hinged to the back 96 along a score line 102 is a lid 104. The lid 104 is also hinged to the sides 98 and 100 by wings 106 and 108 along score lines 110 and 112.

The wing 106 consists of a side panel 114 and a center panel 116. The side panel 114 is hinged to the lid 102 along a score line 118 and to the middle panel 116 along a perforated line 120. The middle panel 116 is hinged to the side 98 along score line 110 and to the left front panel 122 along a score line 124 when viewed in FIG. 4. Hinged to the left front panel 122 along a perforated line 126 is a front panel 128. The front panel 128 is hinged to the front 94 along a score line 130.

To the right side of the front panel 128, as viewed in FIG. 4, is hinged a right front panel 132 along a score line 134. Hinged to the right front panel 132 along a score line 136 is the wing 108. The wing 108 consists of side panel 138 and a center panel 140. The center panel 140 is hinged to the right front panel 132 along score line 136 and to the side panel 136 along a perforated line 142. Hinged to the lid 104 and the back 96 are extensions 144 and 146 which are adapted to be cemented to the inside of the side panel 138 and the side 100 respectively when the litter box 84 is in the assembled condition, as shown in FIGS. 4 and 5.

When the litter box 84 in the fully opened condition, as shown in FIG. 4, the lid 104, the wing 106, the wing 108, the left front panel 122, the right front panel 132 and the front panel 128 are all in a vertical position. When the lid 104 is partially closed, as is shown in FIG. 5, the wing 106, the wing 108, the left front panel 122, the right front panel 132 and the front panel 128 are folded inwardly under the lid 104. In the fully closed position, the back portion of the lid 104 rests on the side panels 106 and 108 while the front portion of the lid 104 rests upon the center panels 116 and 140. In this fully closed position, the center panel 116 rests partially upon the left front panel 122 while the center panel 140 rests partially upon the right front panel 132. The left front panel 122 and the right front panel 132 lie respectively under the center panels 116 and 140, while the front panel 128 in turn lies under the left front panel 122 and the right front panel 132.

As the lid 104 is being closed, a point is reached where it takes a positive pressure to continue closing it. This is because the angle subtended by the score lines 118 and 112 and the perforated lines 120 and 142 are less than 45°. This tends to slightly distort the center panels 116 and 140 and as the closing process is further continued, the center panels 116 and 140 tend to resume their original shape, forcing the lid 104 to close shut without any further positive pressure being applied to it. This maintains the lid 104 in the closed position, requiring a positive pressure to open it.

It is apparent from the above description that I have provided a litter box with a unique closure system which may be made easily from a one-piece cardboard blank. However this litter box can be made of any other flexible material other than a one-piece cardboard blank without departing from the spirit of this invention. Although I have described my invention in terms of a litter box, it is apparent that it may have many other applications such as a combination shipping and display box. Thus, it can be seen that the litter box is of a simple structure and can be manufactured at a low cost and, furthermore, it can be set up for shipping or display purposes with ease.

While there has been described and illustrated preferred embodiments of litter boxes, it is apparent that numerous alternatives, deletions and additions may be made without departing from the spirit thereof.

We claim:

1. A combination litter, shipping and display box comprising a bottom portion having sidewalls, a backwall, a front wall and a movable closure means secured to the sidewalls, the back and the front wall; wherein the said closure means consists of a lid, a plurality of wings connected to said lid and a front panel connected to said plurality of wings, all of which are movably joined together; and wherein the plurality of wings consists of a right wing and a left wing, each of which consists of two side panels, a middle panel and a flap, all movably connected to each other.

2. A combination litter, shipping and display box in accordance with claim 1 wherein a side panel on the right wing and a side panel on the left wing are hinged to either side of the lid along score lines and wherein the said side panel on the right wing is hinged to a middle panel on said right wing and the said side panel on the left wing is hinged to a middle panel on said left wing along perforated lines, said middle panel on the right wing being hinged to another side panel on the right wing and said middle panel on the left wing being hinged to another side panel on the left wing along perforated lines and said other side panels of said right wing and of said left wing being movably connected along score lines to the front panel.

3. A combination litter, shipping and display box in accordance with claim 2 wherein the angle subtended by said score lines and said perforated lines are less than 45°.

4. A combination litter, shipping and display box in accordance with claim 3 wherein the middle panels become slightly distorted as the lid is being closed and as the closing process is continued the middle panels tend to resume their original shape, forcing the lid to snap shut without any further positive pressure.

5. A combination litter, shipping and display box in accordance with claim 2 wherein when said combination litter, shipping and display box is in the fully open condition, the lid, the wings and the front panel are all in a vertical position.

6. A combination litter, shipping and display box in accordance with claim 2 wherein when said combination litter, shipping and display box is in the fully closed position, the lid rests partially on the side panels, the said side panels in turn rest on the middle panels, the said other side panels rest on the middle panels and the front panel rests upon said other side panels.

7. A combination litter, shipping and display box comprising a bottom portion having end walls, a backwall, a front wall and a movable closure means secured to the sidewalls, the backwall and the front wall; wherein the closure means consists of a lid, a plurality of wings connected to said lid, a left front panel and a right front panel connected to said plurality of wings and a front panel connected to the left front panel and right front panel, all of which are movably joined together; wherein the plurality of wings consists of a right wing and a left wing, each of which consists of a side panel and a center panel all movably connected to each other; wherein the side panel on the right wing and the side panel on the left wing are hinged to either side of the lid along the score lines and wherein the said side panel on the right wing is hinged to a center panel on the right wing and the said side panel on the left wing is hinged to a center panel on the left wing along perforated lines, said center panel on the left wing being hinged to a left front panel and said center panel on the right wing being hinged to a right front panel along score lines and said left front panel and said right front panel being movably connected along perforated lines to either side of said front panel and; wherein the angles between the score lines hinging the lid to said side panels and the perforated lines hinging the said side panels to the said center panels are less than 45°.

8. A combination litter, shipping and display box in accordance with claim 7 wherein the center panels become slightly distorted as the lid is being closed and as the closing process is continued, the middle panels tend to resume their original shape, forcing the lid to snap shut without any further positive pressure.

9. A combination litter, shipping and display box in accordance with claim 7 wherein when said combination litter, shipping and display box is in the fully open position, the lid, the wings, the left and right front panels and the front panel are all in a vertical position.

10. A combination litter, shipping and display box in accordance with claim 7 wherein when said combination litter, shipping and display box is in the fully closed position, the back portion of the said lid rests on the side panels while the front portion of the said lid rests on the center panels, the center panels rest upon the left front panel and the right front panel, and the left front panel and the right front panel lie under the center panels while the front panel lies under the left front panel and the right front panel.